US009380472B2

(12) United States Patent
Jeong

(10) Patent No.: US 9,380,472 B2
(45) Date of Patent: Jun. 28, 2016

(54) METHOD AND APPARATUS FOR UPDATING ACCESS POINT INFORMATION FOR LOCATION MEASUREMENT

(75) Inventor: Seung-Hyuk Jeong, Seoul (KR)

(73) Assignee: KT Corporation, Seongnam (KR)

( * ) Notice: Subject to any disclaimer, the term of this patent is extended or adjusted under 35 U.S.C. 154(b) by 292 days.

(21) Appl. No.: 13/310,072

(22) Filed: Dec. 2, 2011

(65) Prior Publication Data

US 2012/0157115 A1     Jun. 21, 2012

(30) Foreign Application Priority Data

Dec. 21, 2010 (KR) .................. 10-2010-0131608

(51) Int. Cl.
*H04W 24/02* (2009.01)
*H04W 16/18* (2009.01)
*H04W 64/00* (2009.01)

(52) U.S. Cl.
CPC .............. *H04W 24/02* (2013.01); *H04W 16/18* (2013.01); *H04W 64/003* (2013.01)

(58) Field of Classification Search
CPC ....... H04W 64/00; H04W 4/02; H04W 24/02; H04W 64/003; H04W 16/18; H04L 29/08657
USPC .................................. 455/456.1–457; 370/338
See application file for complete search history.

(56) References Cited

U.S. PATENT DOCUMENTS

| 8,126,476 B2* | 2/2012 | Vardi et al. ................. 455/456.1 |
| 2002/0045456 A1* | 4/2002 | Obradovich .................. 455/457 |
| 2007/0072624 A1* | 3/2007 | Niemenmaa et al. ....... 455/456.1 |
| 2010/0265092 A1 | 10/2010 | Kim et al. |
| 2012/0100870 A1* | 4/2012 | Prost et al. ................. 455/456.1 |

FOREIGN PATENT DOCUMENTS

| KR | 20060022291 A | 3/2006 |
| KR | 20090055104 A | 6/2009 |
| WO | 2005004528 A1 | 1/2005 |
| WO | 2007056738 A2 | 5/2007 |

* cited by examiner

*Primary Examiner* — Marcos Torres
(74) *Attorney, Agent, or Firm* — Sughrue Mion, PLLC

(57) ABSTRACT

A method and apparatus for updating information of an access point for a wireless local area network service in measuring a location of a communication terminal using the access point are provided. The method includes: storing information of access points in a storage unit; receiving information of nearby access points from a specific communication terminal to be measured for location; checking whether there exists an access point of which information is not stored in the storage unit among the nearby access points; performing a global positioning system (GPS) location measurement for the specific communication terminal when there exists the access point of which the information is not stored; and storing the GPS location measurement result and the information of the nearby access points in the storage unit.

2 Claims, 12 Drawing Sheets

FIG. 4

| GROUP | TIME | LOCATION(LATITUDE /LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.112 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

METHOD AND APPARATUS FOR UPDATING ACCESS POINT INFORMATION FOR LOCATION MEASUREMENT

CROSS-REFERENCE TO RELATED APPLICATION

This application claims priority from Korean Patent Application No. 10-2010-0131608, filed on Dec. 21, 2010 in the Korean Intellectual Property Office, the disclosure of which is incorporated herein by reference in its entirety.

BACKGROUND

1. Field

Exemplary embodiments relate to a location measuring technique using an access point for a wireless local area network (WLAN) service, and more particularly, to a method and apparatus for updating information of an access point in the location measurement using the access point.

2. Description of the Related Art

With the development of mobile communication techniques, studies have been actively made on a location measuring technique that measures a location of a mobile terminal in a communication network. Typically, a global positioning system (GPS)-based location measuring technique using satellites has been widely used.

The GPS-based location measuring technique has a disadvantage of having to mount a GPS receiver on a mobile terminal. Also, because the GPS-based location measuring technique was developed by the U.S. Department of Defense for military use, a high-precision GPS-based location measuring technique is not disclosed. Furthermore, the GPS-based location measuring technique has limited use since the GPS-based location measuring technique is useless in buildings, for example, houses, offices, or shops, where satellite signals cannot be received. To overcome these drawbacks, attempts have been made to measure a location of a terminal using an access point for a WLAN service.

The WLAN service enables users of mobile terminals to wirelessly connect to the Internet through a WLAN access point near the mobile terminals, for example, notebook computers, personal digital assistants (PDAs), smart phones, and the like, that have WLAN cards mounted therein. Recently, to meet the increasing demand for the WLAN service, installation of access points in buildings, such as large-scaled shopping malls, and the like, has been increasing.

Since many access points have now been installed in buildings, by using these access points, a location of a mobile terminal can be measured in buildings where a GPS-based location measuring technique cannot be applied.

Accordingly, research and development on a location measuring technique using an access point for a WLAN service has recently been flourishing.

SUMMARY

One or more exemplary embodiments relate to providing a method and apparatus for updating information of an access point for a wireless local area network (WLAN) service in measuring a location of a communication terminal using the access point.

Additional features will be set forth in the following description, and in part will be even more apparent from the examples set forth, or may be learned by practice of exemplary embodiments.

According to an aspect of an exemplary embodiment, there is provided a method for updating information of an access point in a location measurement using the access point, the method including: storing information of access points in a storage unit; receiving information of nearby access points from a specific communication terminal to be measured for location; checking whether there exists an access point of which information is not stored in the storage unit among the nearby access points; performing a global positioning system (GPS) location measurement for the specific communication terminal when there exists the access point of which the information is not stored according to the checking; and storing the GPS location measurement result and the received information of the nearby access points in the storage unit.

The performing of the GPS location measurement may include performing the GPS location measurement based on the secure user plane location (SUPL) protocol.

According to an aspect of another exemplary embodiment, there is provided an apparatus for updating information of an access point with a link to a GPS location measuring unit in a location measurement using the access point, the apparatus including: a storage unit which stores information of access points; a receiving unit which receives information of nearby access points from a specific communication terminal to be measured for location; and an updating unit which performs a GPS location measurement for the specific communication terminal using the GPS location measuring unit when there exists an access point of which information is not stored in the storage unit among the nearby access points, and which stores the GPS location measurement result and the received information of the nearby access points in the storage unit.

The GPS location measuring unit may perform the GPS location measurement based on the SUPL protocol.

According to an aspect of another exemplary embodiment, there is provided a method for updating information of an access point in a location measurement using the access point, the method including: storing information of access points in a storage unit; receiving information of nearby access points from a specific communication terminal to be measured for location; checking whether there exists a first access point of which information is not stored in the storage unit among the nearby access points; when there exists the first access point of which the information is not stored, performing a location measurement for the specific communication terminal using nearby access points excluding the first access point, and storing a result of the location measurement and the information of the nearby access points in the storage unit.

According to an aspect of another exemplary embodiment, there is provided an apparatus for updating information of an access point in a location measurement using the access point, the apparatus including: a storage unit which stores information of access points; a receiving unit which receives information of nearby access points from a specific communication terminal to be measured for location; a location measuring unit which, when there exists a first access point of which information is not stored in the storage unit among the nearby access points, performs a location measurement for the specific communication terminal using nearby access points excluding the first access point; and an updating unit which stores a result of the location measurement of the location measuring unit and the received information of the nearby access points in the storage unit.

DESCRIPTION OF THE DRAWINGS

FIG. 4 is a table of access point information for location according to an exemplary embodiment;

Figure 1:
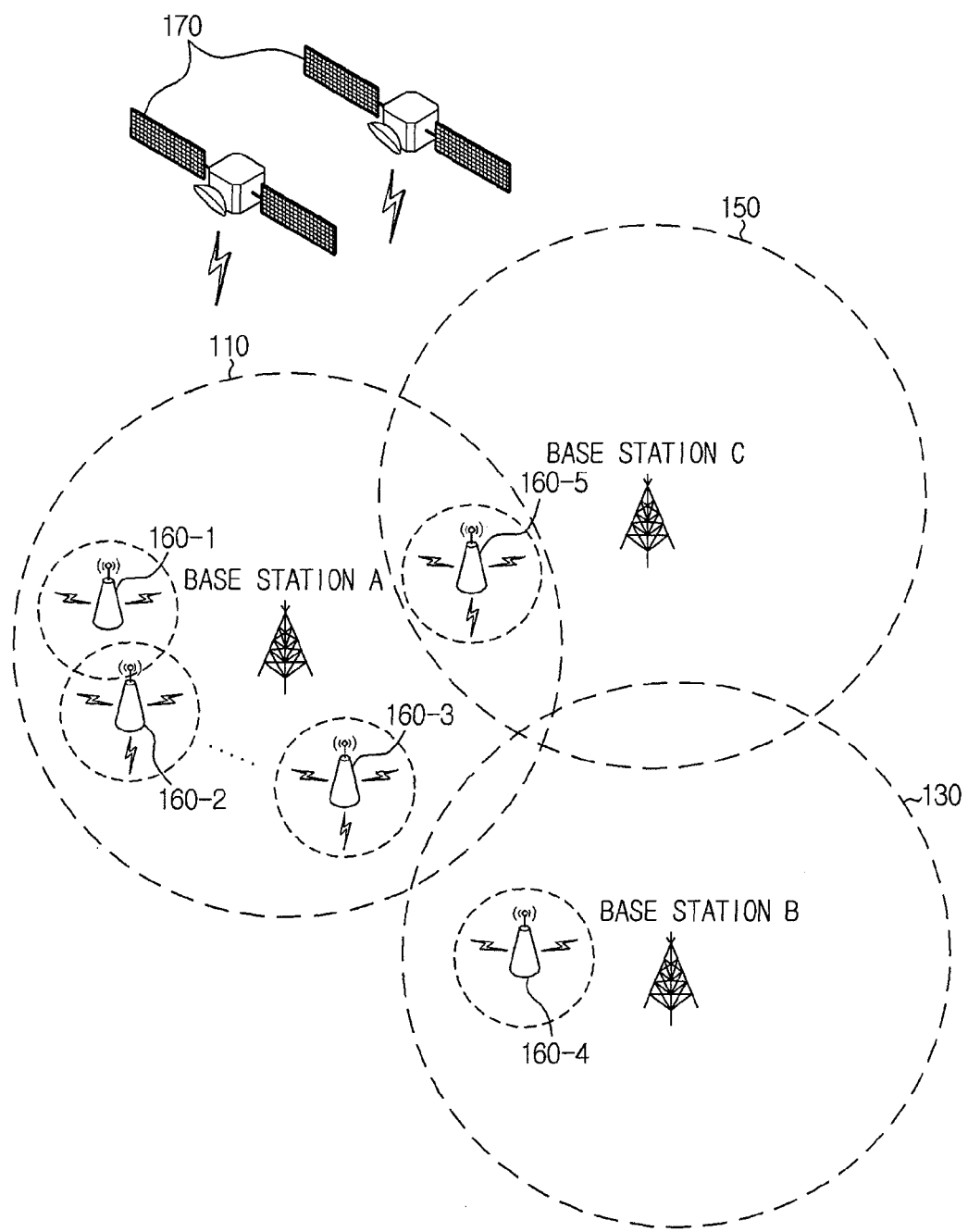
FIG. 1 is a diagram illustrating a communication environment according to an exemplary embodiment.

Throughout the drawings and the detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a communication environment according to an exemplary embodiment.

Referring to FIG. 1, the communication environment includes base stations (or NodeBs) that provide a mobile communication service, and access points (APs) 160-1, ..., 160-5 that provide an Internet service using a wireless local area network (WLAN) system, for example, Wireless Fidelity (WiFi), in an overlapping arrangement. A communication terminal may use various services including voice communication and wireless Internet services via the base stations when the communication terminal is mobile. Also, the communication terminal may use an Internet service by connecting to a wired Internet network via the access points.

Generally, the base station may have a coverage area of several kilometers to tens of kilometers in radius, while the access point providing a WLAN service may have a coverage area of only several meters in radius. Due to the low costs for purchasing and installing the access point, they are installed in large numbers at various places such as houses, offices, shopping malls, and the like.

As shown in FIG. 1, a plurality of access points 160-1, ..., 160-5 are placed within the coverage areas 110, 130, and 150 of base stations. Communication terminal users use an Internet service via the access points 160-1, ..., 160-5 at locations where signals of the access points 160-1, ..., 160-5 are detected. Also, where signals of the access points 160-1, ..., 160-5 are not detected, the communication terminal users use an Internet service via the base stations.

Recently, with the advancement of smart phone functions (i.e., operations), the number of smart phone users is increasing. To provide a high-speed Internet service to smart phones, the number of access points installed is also increasing. As many access points are particularly installed (i.e., located) in places with a large floating population, the use of the access points in location measurement is increasing. The accuracy of location measurement using an access point with a narrow coverage is higher than that of a base station with a wide coverage.

As shown in FIG. 1, a global positioning system (GPS) satellite 170 orbits in space to provide GPS location information of the communication terminal.

Figure 2:
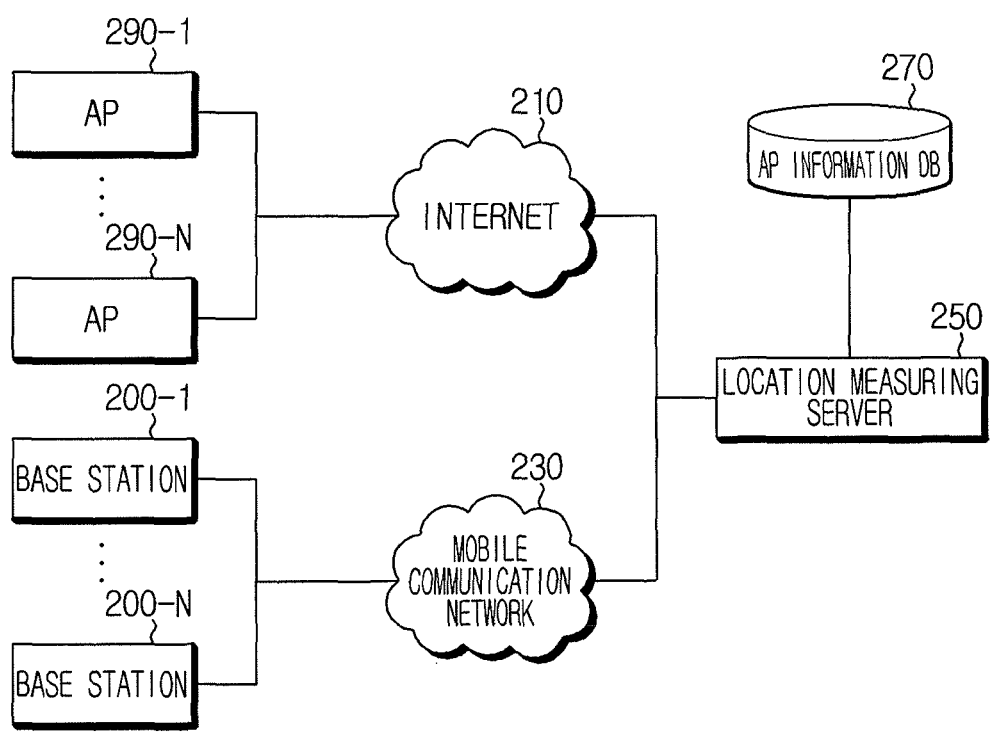
FIG. 2 is a block diagram illustrating a network structure of a location measuring system according to an exemplary embodiment.

FIG. 2 is a block diagram illustrating a network structure of a location measuring system according to an exemplary embodiment.

Referring to FIG. 2, access points 290-1, ..., 290-N providing a WLAN service and base stations 200-1, ..., 200-N providing a mobile communication service are provided in the network structure. As shown in FIG. 1, the coverage area of the access points 290-1, ..., 290-N and the coverage area of the base stations 200-1, ..., 200-N may overlap. A plurality of access points may be placed within one base station because the base station has a wider coverage area than the access point.

The access points 290-1, ..., 290-N are connected to a wired Internet network 210 to provide an Internet service. The base stations 200-1, ..., 200-N are connected to a mobile communication network 230 to provide a mobile communication service. The wired Internet network 210 and the mobile communication network 230 are linked to each other. Referring to FIG. 2, the location measuring system includes a location measuring server 250 connected to the wired Internet network 210 and the mobile communication network 230, and an access point information DB 270 managed by the location measuring server 250.

The access point information DB 270 stores identity information (for example, Media Access Control (MAC) address, Service Set Identifier (SSID), and the like) of access points installed (i.e., located) indoors and outdoors and location coordinate information where the access points are actually installed. Also, the access point information DB 270 stores access point information for location that is collected at each location by an access point information collecting terminal while the access point information collecting terminal is mobile. The access point information for location includes collection location information collected by the access point information collecting terminal at a predetermined time cycle while the access point information collecting terminal is mobile, identity information and signal strength of access points detected at the collection locations, and identity information of base stations. A detailed description thereof will be provided below.

When the location measuring server 250 is requested to measure a location of a specific communication terminal, the location measuring server 250 measures a location of the communication terminal using identity information of a base station 200-1, . . . , 200-N where the communication terminal is placed and identity information of an access point 290-1, . . . , 290-N to which the communication terminal is connected. A location measuring method of the location measuring server 250 is described in detail below.

Figure 3:
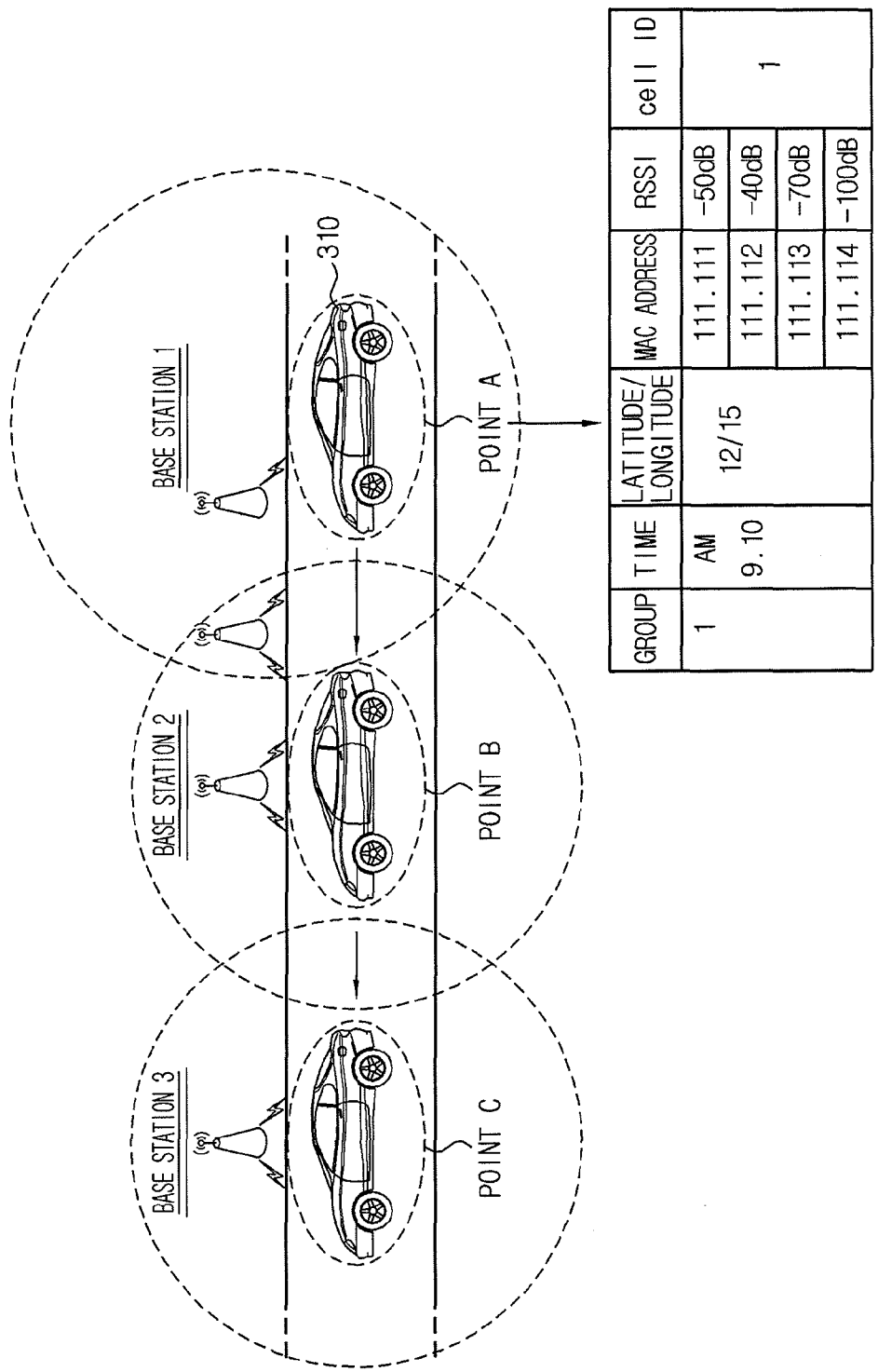
FIG. 3 is a diagram illustrating a collection of access point information for location according to an exemplary embodiment.

FIG. 3 is a diagram illustrating the collection of access point information for location according to an exemplary embodiment.

As shown in FIG. 3, an access point information collecting terminal mounted in a vehicle 310 collects information by detecting signals from nearby access points at a predetermined time cycle while the vehicle 310 is moving at low speed. The information collected by the access point information collecting terminal includes collection time, collection location information (for example, latitude and longitude), identity information (for example, MAC address) and signal strength (for example, Received Signal Strength Indication (RSSI)) of an access point which transmits a signal detected at a collection location, and identity information (for example, cell ID or Pseudo Noise (PN) code) of a base station which covers the corresponding collection location.

Referring to FIG. 3, taking point A as an example, the access point information collecting terminal mounted in the vehicle 310 collects information of an access point which transmits a signal detected at the point A. For example, the access point information collecting terminal collects latitude and longitude information of the point A, collection time, MAC address and signal strength (RSSI) of the access point which transmits the signal detected at the point A, and identity information of a base station which covers the point A. As described above, the access point information collecting terminal collects information of access points detected at every point at a predetermined time cycle (for example, every minute) while moving at low speed.

FIG. 4 is a table of access point information for location according to an exemplary embodiment. As described above with reference to FIG. 3, the access point information collecting terminal collects information of nearby access points at a predetermined time cycle while moving, and the collected access point information for location is shown in FIG. 4. As shown in FIG. 4, the table has a time field 410, a location field 430, a MAC address field 450, an RSSI field 470, and a cell ID field 490.

The time field 410 records the time when the access point information collecting terminal collects information of an access point. The location field 430 records collection location information (e.g., latitude and longitude information). The MAC address field 450 records a MAC address of an access point detected at a collection location. The RSSI field 470 records the signal strength from an access point detected at a collection location. The cell ID field 490 records a cell ID of a base station covering a collection location. Although FIG. 4 shows only one cell ID for a base station being recorded, a plurality of cell IDs detected at the cell boundary may be recorded.

Figure 5:
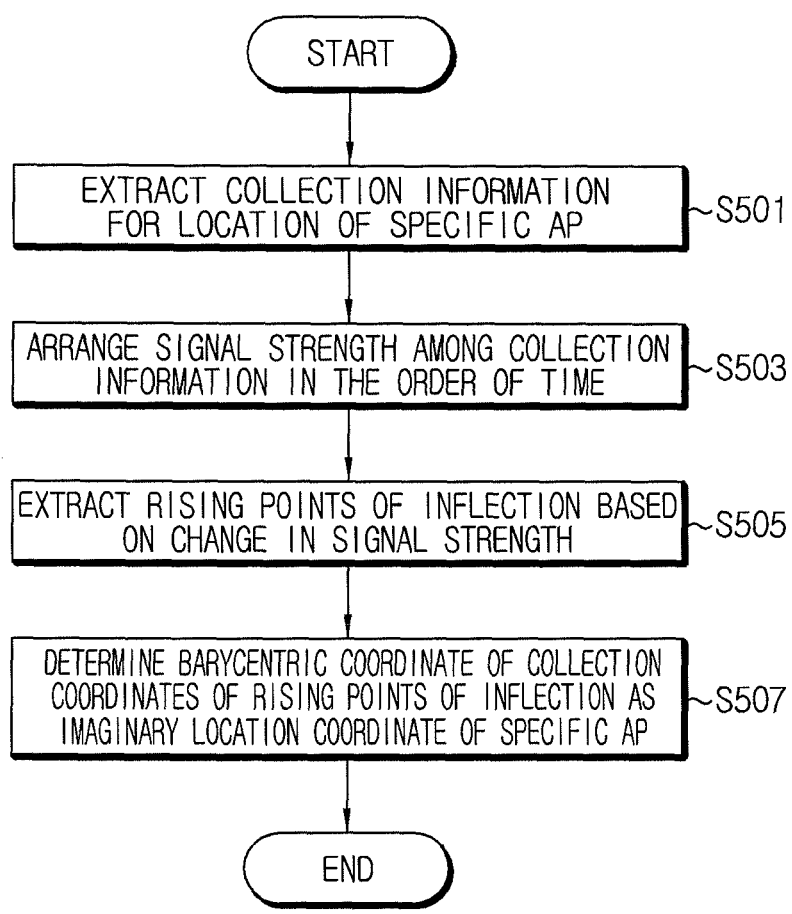
FIG. 5 is a flowchart illustrating a process for determining an imaginary location coordinate of an access point in a location measuring server according to an exemplary embodiment.

To measure a location of a communication terminal using an access point, the location measuring method according to the present exemplary embodiment utilizes installation location coordinates of access points. Generally, the access points 160 installed all around by communication service providers have their installation location coordinates given by the communication service providers. However, a personal access point installed personally is not related to the communication service providers. Accordingly, an installation location coordinate of the personal access point may not be known unless the installation location coordinate is identified by an installer. Accordingly, there is a need to estimate an installation location coordinate of an access point, of which the installation location coordinate is not identified, among the access points of which information is collected by the access point information collecting terminal while the access point information collecting terminal is mobile, as described above with reference to FIG. 3. Hereinafter, described with reference to FIG. 5 is a process for estimating an installation location coordinate of an access point, of which the installation location coordinate is not identified, among access points of which information is collected by the access point information collecting terminal while the access point information collecting terminal is mobile, according to an exemplary embodiment. That is, an estimated installation location coordinate of an access point is hereinafter referred to as an imaginary location coordinate of the access point determined based on an estimated value, and not an actual location coordinate where the access point is actually installed.

FIG. 5 is a flowchart illustrating a process for determining an imaginary location coordinate of an access point in the location measuring server 250 according to an exemplary embodiment.

Referring to FIG. 5, the access point information collecting terminal collects information by detecting signals from nearby access points at a predetermined time cycle while moving at low speed, as described above with reference to FIGS. 3 and 4. The access point information for location collected by the access point information collecting terminal may be transmitted to the location measuring server 250 via the Internet network 210 or the mobile communication network 230. The location measuring server 250 stores the received access point information for location in the access point information DB 270. Alternatively, the access point information for location collected by the access point information collecting terminal may be stored in the access point information DB 270 by an operator.

After the access point information for location is collected, the location measuring server 250 extracts, from the access point information DB 270, collection information for location of a specific access point, of which an installation location coordinate is not identified, among the collected access point information for location (operation S501). That is, the location measuring server 250 extracts collection information for location including information of the specific access point. For example, when a MAC address is '111.112' as shown in FIG. 4, the location measuring server 250 extracts information of Group 1, Group 2, Group 3, Group 4, and Group N−1 including MAC address '111.112'.

After the collection information for location of the specific access point is extracted as described above, the location measuring server 250 extracts the signal strength (for example, RSSI) among the collection information for location and arranges the extracted signal strength in the order of time (operation S503). For example, referring to FIG. 4, the time sequential arrangement of the signal strength of the access point having MAC address '111.112' is −40 dB, −50 dB, −80 dB, −80 dB and −40 dB.

Figure 6:
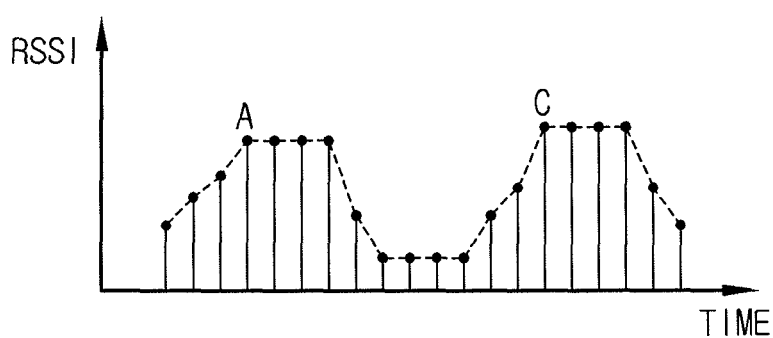
FIG. 6 is a graph illustrating an example of an extraction of a rising point of inflection based on a signal strength distribution of an access point over time according to an exemplary embodiment.

After the location measuring server 250 arranges the signal strength of the specific access point in the order of time, the location measuring server 250 extracts a rising point of inflection by analyzing the changes in the signal strength over time (operation S505). Here, the rising point of inflection is a point where the signal strength rises and reaches the highest. Specifically, FIG. 6 shows an example of extraction of a rising point of inflection based on a signal strength distribution over time. As shown in FIG. 6, when the signal strength of the access point is arranged in the order of time, points A and C are where the signal strength rises and reaches the highest, and thus, are extracted as rising points of inflection.

After the rising points of inflection are extracted as described above, the location measuring server 250 calculates a barycentric coordinate of a polygon (or a straight line) by using the apices of collection location coordinates of the rising points of inflection, that is, collection location coordinates where the signal strength of the rising points of inflection is collected. Also, the location measuring server 250 determines the calculated barycentric coordinate as an imaginary location coordinate of the specific access point, and stores the imaginary location coordinate in the access point information DB 270 (operation S507). Here, the barycentric coordinate may be replaced by the incenter, the circumcenter, and the like. Also, the barycentric coordinate may be adjusted by applying a weight to the signal strength.

In the present exemplary embodiment, the reason for using a rising point of inflection is because the rising point of inflection is a point where the signal strength of an access point is highest, and thus, is closest to a location where the access point is actually installed.

The process for determining an imaginary location coordinate of an access point as described with reference to FIG. 5 is performed on all access points, of which installation location coordinates are not identified, among the access points collected by the access point information collecting terminal while the access point information collecting terminal is mobile.

Figure 7:
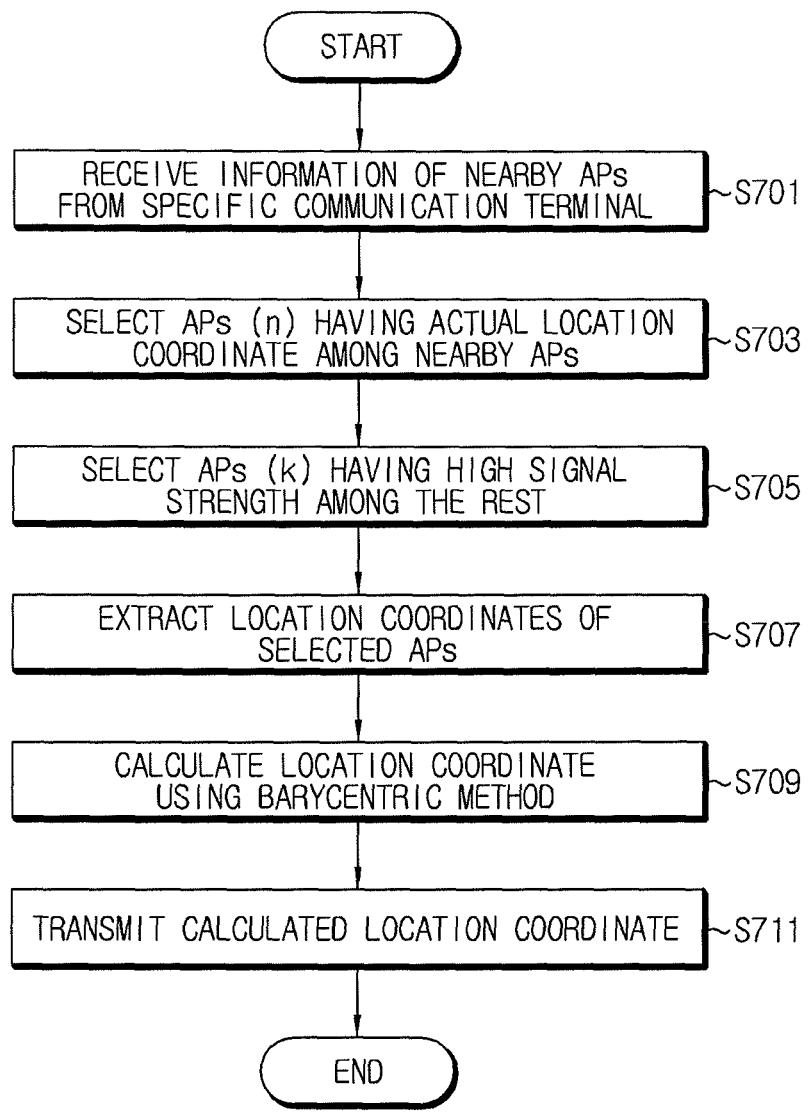
FIG. 7 is a flowchart illustrating a process for measuring a location of a communication terminal in a location measuring server according to an exemplary embodiment.

FIG. 7 is a flowchart illustrating a process for measuring a location of a communication terminal in the location measuring server 250 according to an exemplary embodiment.

Referring to FIG. 7, the location measuring server 250 receives a location measurement request for a specific communication terminal to be measured for its location. The location measuring server 250 receives identity information (for example, MAC address or SSID) and signal strength information of a nearby access point from the specific communication terminal (operation S701).

The location measuring server 250 controls the specific communication terminal to transmit the information (for example, identity information and signal strength information) of the nearby access point using identity information of the specific communication terminal. The specific communication terminal may transmit information (for example, identity information and signal strength) of a plurality of nearby access points.

Next, the location measuring server 250 first selects access points having an actual installation location coordinate among the nearby access points of which information is received from the specific communication terminal (operation S703). That is, the location measuring server 250 checks whether there is an access point having an actual installation location coordinate stored in the access point information DB 270, using the identity information (for example, MAC address) of the nearby access points. In the present example, it is assumed that the number of the selected access points is 'n'.

In this instance, when there is no access point having an actual installation location coordinate, an access point is not selected in this operation. When selecting an access point having an actual installation location coordinate, only an access point having a predetermined signal strength or higher may be selected. A low signal strength may be interpreted as being located at a distance away from the specific communication terminal, and accordingly, an access point having a low signal strength is not selected even though its actual installation location coordinate exists.

Next, the location measuring server 250 selects the top k access points based on the signal strength among nearby access points excluding access points having an actual installation location coordinate (operation S705). For example, when there are six access points having an actual installation location coordinate among thirty nearby access points of which information is received from the specific communication terminal, the location measuring server 250 selects the top k access points having a high signal strength among the twenty four access points not having actual location coordinates.

Here, $R=(k+n)$ may be $L^i$ where L is a natural number of 3 or more and i is a natural number of 2 or more. When the number n of access points having an actual installation location coordinate is R in operation S703, this operation S705 may be omitted.

Next, the location measuring server 250 extracts location coordinates of the selected R access points from the access point information DB 270 (operation S707).

Specifically, for access points having an actual installation location coordinate, the location measuring server 250 extracts their actual installation location coordinates from the access point information DB 270.

For access points not having an actual installation location coordinate, the location measuring server 250 checks whether their imaginary location coordinates are stored in the access point information DB 270, and if so, extracts the imaginary location coordinates from the access point information DB 270.

For access points not having an actual installation location coordinate and an imaginary location coordinate, the location measuring server 250 extracts collection location coordinates of the top i (where i is the number of access points) access points having a high signal strength from the access point information DB 270 based on signal strength for location of the corresponding access points detected at each collection location, as location coordinates of the corresponding access points.

For example, when there are three access points A, B, and C not having an actual installation location coordinate and an imaginary location coordinate in which the signal strength for location of access point A is −40 dB and −50 dB, that of access point B is −50 dB, −60 dB, and −70 dB, and that of access point C is −60 dB and −100 dB, the top three signal strengths are −40 dB and −50 dB of the access point A and −50 dB of the access point B. The location measuring server 250 extracts collection location coordinates where −40 dB and −50 dB of the access point A and −50 dB of the access point B are collected, as location coordinates of the access points not having an actual installation location coordinate and an imaginary location coordinate.

After the location coordinates of the access points selected in operations S703 and S705 are extracted as described above, the location measuring server 250 calculates a final location coordinate using the extracted location coordinates by the barycentric method (operation S709). Also, the location measuring server 250 transmits the final location coordinate to an object that have requested location measurement (for example, a communication terminal, a web server, and the like) (operation S711). The final location coordinate may be provided in the form of a map, or may be provided by transforming into an address corresponding to the coordinate. However, it is understood that the form of location information to be provided is not limited thereto.

The calculating of the location coordinate using the barycentric method in operation S709 according to an exemplary embodiment is described in detail with reference to FIG. 8.

Figure 8:
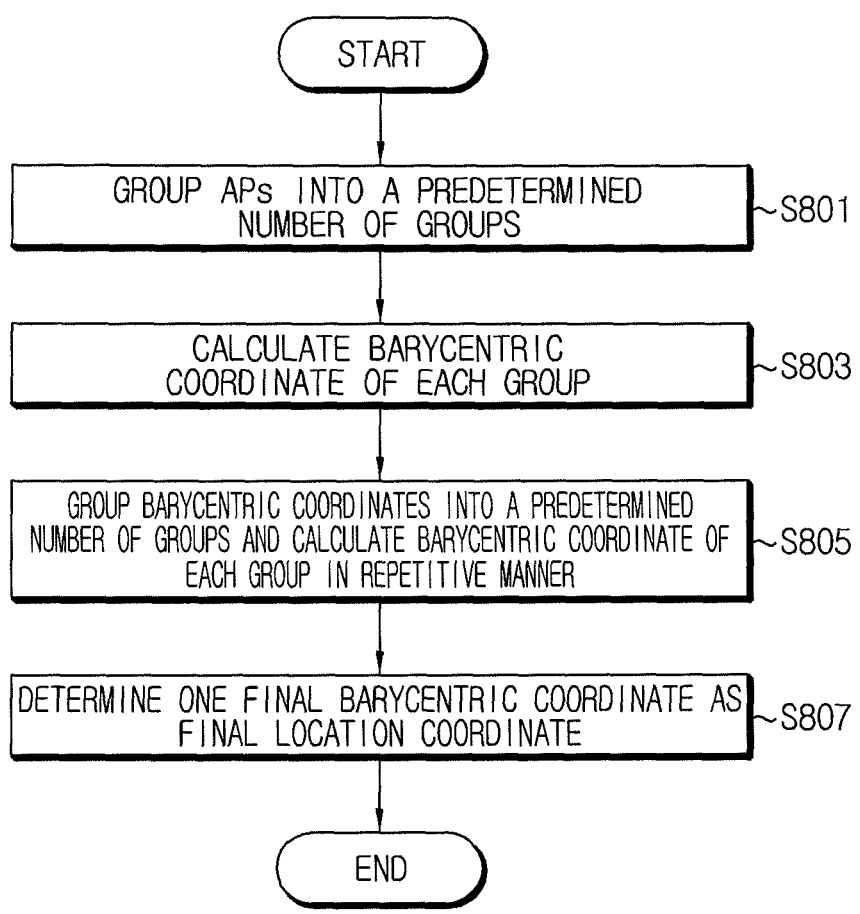
FIG. 8 is a flowchart illustrating a process for calculating a location coordinate using a barycentric method according to an exemplary embodiment.

FIG. 8 is a flowchart illustrating a process for calculating a location coordinate using the barycentric method according to an exemplary embodiment.

As shown in FIG. 8, the location measuring server 250 groups the access points extracted in operation S707 of FIG. 7 into a predetermined number of groups, each group composed of M (where M is a natural number of 3 or more, and may be equal to L) access points (operation S801), and calculates a barycentric coordinate of each group using location coordinates of access points in each group (operation S803).

Figure 9:
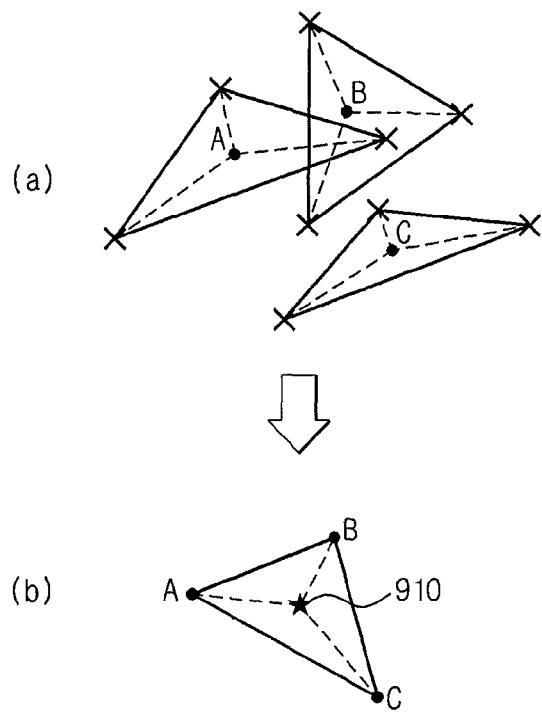
FIG. 9 is a diagram illustrating a calculation of a location coordinate of a communication terminal according to an exemplary embodiment.

A detailed description of calculating a barycentric coordinate will now be provided with reference to FIG. 9. FIG. 9 is a diagram illustrating the calculation of a barycentric coordinate according to an exemplary embodiment. In the exemplary embodiment described with reference to FIG. 7, R is 9 and M is 3. In operation S707, when nine access points are selected, the selected nine access points are grouped into three groups, in which three access points are randomly selected in each group. As shown in (a) of FIG. 9, a barycentric coordinate of a triangle is calculated, the triangle having location coordinates (actual installation location coordinates or imaginary location coordinates) of three access points in each group as the apices. In (a) of FIG. 9, 'A', '13', and 'C' are each a barycentric coordinate of a respective group.

Access points having an actual installation location coordinate may be equally distributed to each group. For example, when there are three access points having an actual installation location coordinate, one access point having an actual installation location coordinate is included in each group. This is to reduce an error in location measurement by including an actual installation location coordinate in each group because the actual installation location coordinate is a location where an access point is actually installed.

Next, after the barycentric coordinate is calculated as described above, the location measuring server 250 groups the calculated barycentric coordinates into a predetermined number of groups, in which M barycentric coordinates are randomly selected in each group, and re-calculates a barycentric coordinate of each group. This process is repeated until one barycentric coordinate is obtained (operation S805).

Specifically, in (a) of FIG. 9, the calculated barycentric coordinates are 'A', 'B', and 'C'. Because three barycentric coordinates are sufficient to form a group, further grouping is not necessary. When a barycentric coordinate of a triangle having the three barycentric coordinates as the apices is calculated, one final barycentric coordinate 910 is obtained as shown in (b) of FIG. 9.

Finally, the location measuring server 250 determines one final barycentric coordinate 810 obtained by the barycentric method as a final location of the communication terminal (operation S807).

The present exemplary embodiment is described based on that R is $L^i$. This is because a polygon (for example, a triangle) of the same pattern is used to calculate a barycentric coordinate in operations S803 and S805 when M is set to equal L. However, it is understood that R need not equal $L^i$ according to one or more other exemplary embodiments. In operations S803 and S805 for calculating a barycentric coordinate by grouping, when a number X (where M<X<2×M) of barycentric coordinates remain at the end, a final barycentric coordinate may be calculated by forming a polygon having the number X (where M<X<2×M) of barycentric coordinates as the apices. Alternatively, a final barycentric coordinate may be calculated by grouping the number of barycentric coordinates into groups, in which the number of barycentric coordinates in each group may not be equal.

The exemplary embodiment described with reference to FIGS. 7 and 8 is described based on nine or more nearby access points. However, in the case of two or three nearby access points, a barycentric coordinate of the two or three access points is determined as a final location coordinate of the communication terminal. In the case of four nearby access points, a barycentric coordinate of three access points among the four access points is calculated first, then a barycentric coordinate of the calculated barycentric coordinate and a location coordinate of the other access point is calculated and determined as a final location coordinate of the communication terminal. As described above, when there are nine or less nearby access points, proper grouping of the access points and calculating of a barycentric coordinate may be performed to obtain a final one location coordinate.

Figure 10:
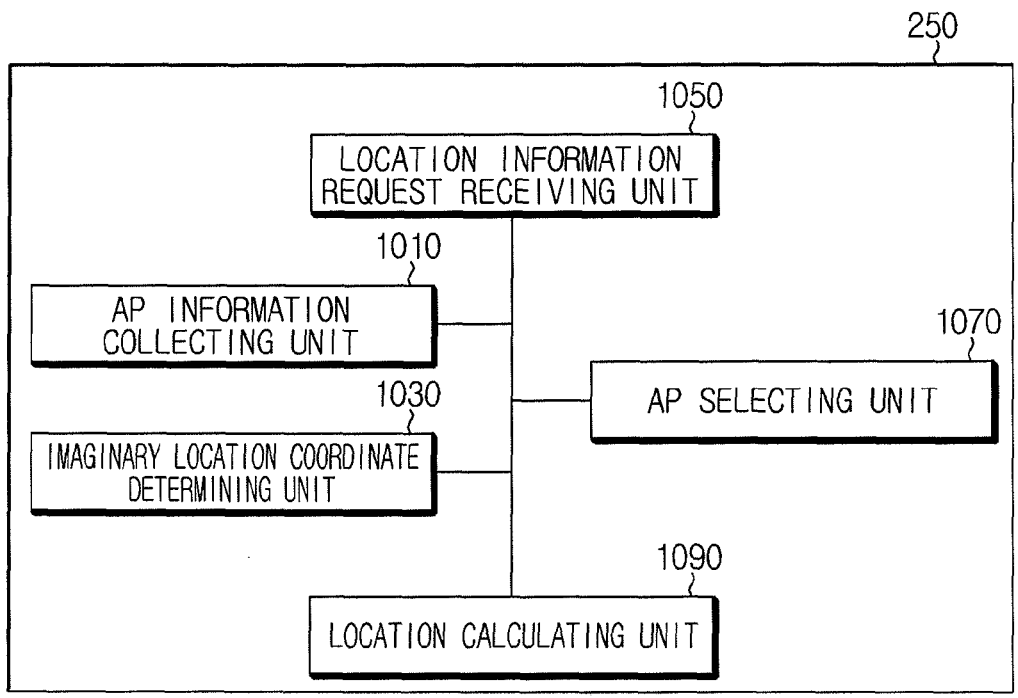
FIG. 10 is a block diagram illustrating a structure of a location measuring server according to an exemplary embodiment.

FIG. 10 is a block diagram illustrating a structure of the location measuring server 250 according to an exemplary embodiment.

Referring to FIG. 10, the location measuring server 250 according to an exemplary embodiment includes an access point information collecting unit 1010, an imaginary location coordinate determining unit 1030, a location information request receiving unit 1050, an access point selecting unit 1070, and a location calculating unit 1090.

The access point information collecting unit 1010 receives access point information for location collected by the access point information collecting terminal at a predetermined time cycle, and stores the access point information for location in the access point information DB 270. The access point information collecting unit 1010 may directly receive access point information for location from the access point information collecting terminal via the Internet network 210 or the mobile communication network 230. An example of the access point information for location is shown in FIG. 4.

The imaginary location coordinate determining unit 1030 estimates and determines location coordinates of access points not having an actual installation location coordinate based on the access point information for location collected by the access point information collecting unit 1010. The location coordinate estimated and determined by the imaginary location coordinate determining unit 1030 is referred to as an imaginary location coordinate.

Specifically, the imaginary location coordinate determining unit 1030 extracts, from the access point information DB 270, collection information for location of a specific access point, of which an actual installation location coordinate is not identified, among the collected access points. Also, after the imaginary location coordinate determining unit 1030 extracts the collection information for location of the specific access point, the imaginary location coordinate determining unit 1030 extracts the signal strength (for example, RSSI) among the collection information for location, arranges the extracted signal strength in the order of time, and analyzes the changes in the signal strength over time to extract a rising point of inflection. Here, the rising point of inflection is a point where the signal strength rises and reaches a highest level.

FIG. 6 illustrates an example of the extraction of a rising point of inflection based on a signal strength distribution of an access point over time. As shown in FIG. 6, when the signal strength of the access point is arranged in the order of time, points A and C are where the signal strength rises and reaches the highest, and are thus, extracted as rising points of inflection.

When the rising points of inflection are extracted, the imaginary location coordinate determining unit 1030 calculates a barycentric coordinate of collection location coordinates of the rising points of inflection, that is, collection location coordinates where the signal strength of the rising points of inflection is collected, determines the calculated barycentric coordinate as an imaginary location coordinate of the specific access point, and stores the imaginary location coordinate in the access point information DB 270. Here, the barycentric coordinate may be replaced by the incenter, the circumcenter, and the like.

Accordingly, an actual installation location coordinate or an imaginary location coordinate of each access point is stored in the access point information DB 270.

The location information request receiving unit 1050 receives a location measurement request for a specific communication terminal. The location measurement request may be received from another communication network equipment by the request of another communication terminal. When the location information request receiving unit 1150 receives the location measurement request, the location information request receiving unit 1050 controls the specific communication terminal so as to receive identity information (for example, MAC address or SSID) and signal strength of nearby access points from the specific communication terminal.

The access point selecting unit 1070 selects R access points among the nearby access points of which information is received by the location information request receiving unit 1050. Here, R may be $L^i$ where L is a natural number of 3 or more and i is a natural number of 2 or more.

When selecting R access points, the access point selecting unit 1070 selects access points having an actual installation location coordinate by referring to the access point information DB 270, and selects the other access points having a high signal strength.

Accordingly, when there are R access points having an installation location coordinate, only access points having an actual installation location coordinate are selected, and if insufficient, access points having a high signal strength (where the signal strength is a value measured and reported by the specific communication terminal) are selected. In this instance, when selecting access points having an actual installation location coordinate, only access points having a predetermined signal strength or higher may be selected. Here, the signal strength is that of nearby access points of which information is received from the specific communication terminal.

The location calculating unit 1090 extracts location coordinates of the access points selected by the access point selecting unit 1070 from the access point information DB 270, and calculates a final one location coordinate using the extracted location coordinates by the barycentric method.

Specifically, for access points having an installation location coordinate, the location calculating unit 1090 extracts their actual installation location coordinates from the access point information DB 270.

For access points not having an actual installation location coordinate, the location calculating unit 1190 checks whether their imaginary location coordinates are stored in the access point information DB 270, and if so, extracts the imaginary location coordinates from the access point information DB 270.

For access points not having an actual installation location coordinate and an imaginary location coordinate, the location calculating unit 1090 extracts collection location coordinates of the top i (where i is the number of access points) access points having a high signal strength based on signal strength for location detected at each collection location of the corresponding access points, as location coordinates of the corresponding access points.

For example, when there are three access points A, B, and C not having an actual installation location coordinate and an imaginary location coordinate, in which the signal strength for location of access point A is −40 dB and −50 dB, that of access point B is −50 dB, −60 dB, and −70 dB, and that of access point C is −60 dB and −100 dB, the top three signal strengths are −40 dB and −50 dB of the access point A and −50 dB of the access point B. The location calculating unit 1090 extracts collection location coordinates where −40 dB and −50 dB of the access point A and −50 dB of the access point B are collected, as location coordinates of the access points not having an actual installation location coordinate and an imaginary location coordinate.

The location calculating unit 1090 groups the access points selected by the access point selecting unit 1070 into a predetermined number of groups, each group composed of randomly selected M (where M is a natural number of 3 or more, and may be equal to L) access points, and calculates a barycentric coordinate of each group using the location coordinates of the access points. In this instance, the location calculating unit 1090 equally distributes the access points having an actual installation location coordinate to each group.

Also, the location calculating unit 1090 groups the calculated barycentric coordinates into a predetermined number of groups, each group composed of randomly selected M barycentric coordinates, and re-calculates a barycentric coordinate of each group. The location calculating unit 1090 repeats this process until one barycentric coordinate is obtained, and determines the obtained one barycentric coordinate as a final location of the specific communication terminal.

When the location calculating unit 1090 calculates a barycentric coordinate by grouping, if a number X (where M<X<2×M) of barycentric coordinates remain at the end, the location calculating unit 1090 may calculate one final barycentric coordinate by forming a polygon having the number X (where M<X<2×M) of barycentric coordinates as the apices.

Alternatively, the location calculating unit 1090 may calculate one final barycentric coordinate by grouping barycentric coordinates into groups, in which the number of barycentric coordinates in each group is not equal.

The final coordinate calculated by the location calculating unit 1090 is transmitted to an object that have requested location measurement.

The access point described in the present exemplary embodiment may be a micro base station, a pico base station, a UbiCell base station, and the like, depending on the policies of manufacturers or communication providers. Accordingly, it should be understood that the access point of the present exemplary embodiment is a gateway point capable of providing an Internet service to a communication terminal through a common Internet line by directly communicating with the communication terminal via local area communications.

Also, it is obvious that the location measuring method of exemplary embodiments may be applied indoors as well as outdoors. In this instance, while a latitude and longitude coordinate may be used as a collection location coordinate outdoors, an imaginary location coordinate may be used as a collection location coordinate indoors. For example, the location measuring method of an exemplary embodiment may measure a location of a communication terminal using the barycentric method by setting imaginary location coordinates on each floor of a building classified by coordinates and collecting information of access points at each coordinate.

Figure 11:
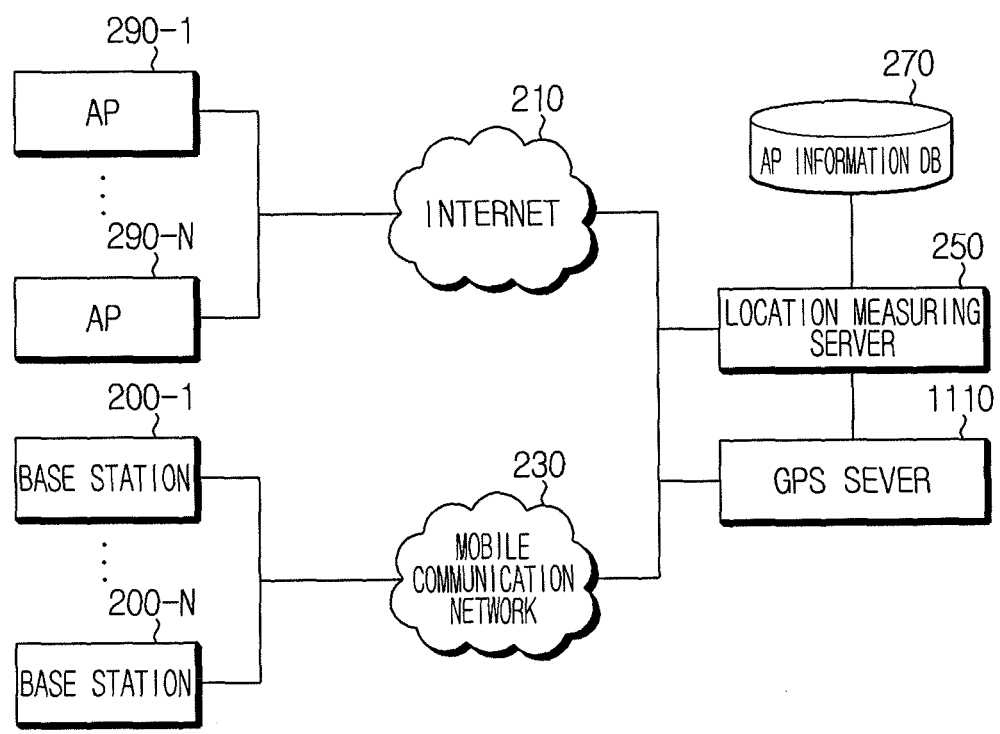
FIG. 11 is a block diagram illustrating a network structure of a location measuring system according to another exemplary embodiment.

FIG. 11 is a block diagram illustrating a network structure of a location measuring system according to another exemplary embodiment. In FIG. 11, the elements having the same reference numerals as those of FIG. 2 perform the same or similar operations as described with reference to FIG. 2. Accordingly, the same description is omitted herein.

As shown in FIG. 11, the location measuring system further includes a GPS server 1110.

As described above, when the location measuring server 250 measures a location of a specific communication terminal using access points 290-1, ..., 290-N, the location measuring server 250 extracts, from the access point information DB 270, location coordinates (actual installation location coordinates, imaginary location coordinates, or collection location coordinates) of the access points 290-1, ..., 290-N detected and transmitted by the specific communication terminal, and uses the extracted location coordinates to measure the location of the specific communication terminal.

In this instance, when the location measuring server 250 cannot extract, from the access point information DB 270, a location coordinate of a certain access point among the access points 290-1, ..., 290-N of which information is received from the specific communication terminal, that is, there is a new access point among the access points of which information is received from the specific communication terminal, the location measuring server 250 requests the GPS server 1110 to measure a location of the specific communication terminal. When the location measuring server 250 receives a location coordinate of the specific communication terminal from the GPS server 1110, the location measuring server 250 stores the received location coordinate and the received information of the access points 290-1, ..., 290-N in the access point information DB 270.

As described with reference to FIG. 3, the access point information collecting terminal collects information by detecting signals from access points at a predetermined time cycle while the access point information collecting terminal is mobile, and stores the collected information of the access points in the access point information DB 270. In this instance, a new access point may be provided or installed subsequent to the information collection. Information of the new access point is received from the specific communication terminal and stored in the access point information DB 270 to update the information of the access points.

When the location measuring server 250 selects some access points among the nearby access points of which information is received from the specific communication terminal to measure a location of the specific communication terminal, the location measuring server 250 selects access points excluding the new access point among the nearby access points of which information is received from the specific communication terminal.

Also, when the location measuring server 250 estimates imaginary location coordinates of access points using the collection information for location of the access points as described above with reference to FIGS. 5 and 6, information of a new access point received from the specific communication terminal and stored in the access point information DB 270 as described above is used in estimating imaginary location coordinates of access points and is referred to in extracting a location coordinate of the specific communication terminal.

The GPS server 1110 may measure a location of the specific communication terminal based on the secure user plane location (SUPL) protocol. However, it is understood that one or more other exemplary embodiments are not limited in this regard, and, for example, a variety of GPS-based location measuring techniques may be applied.

Figure 12:
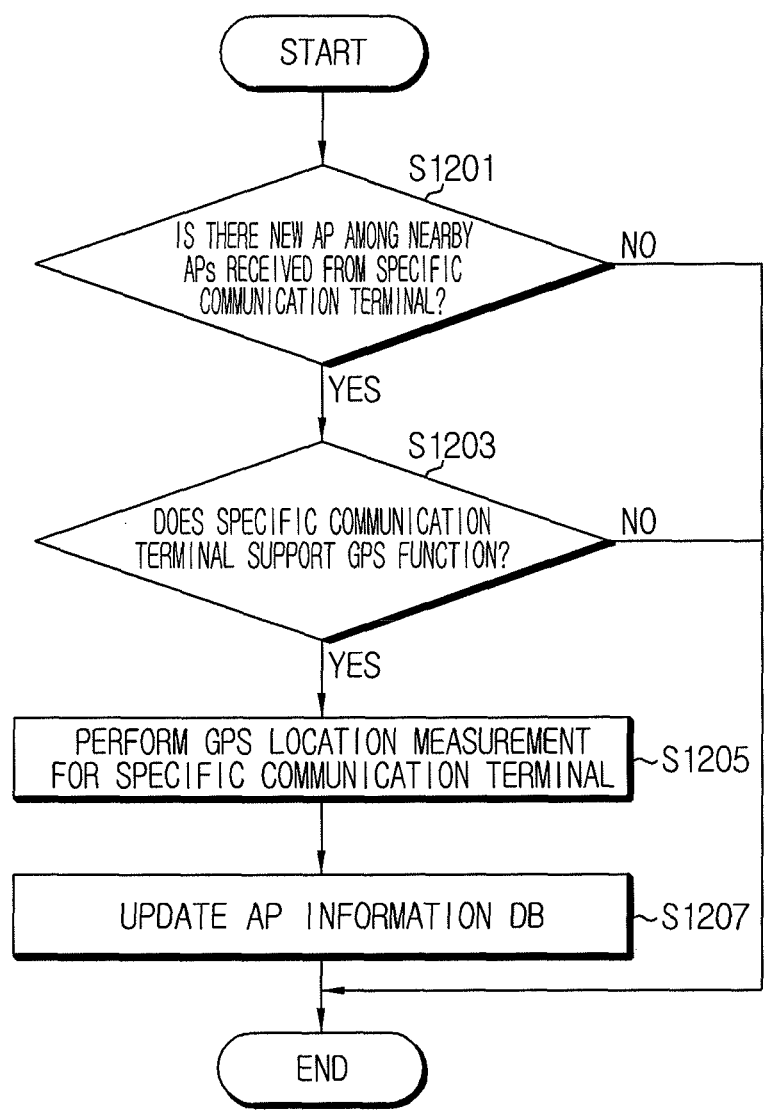
FIG. 12 is flowchart illustrating a process for updating information of an access point according to an exemplary embodiment.

FIG. 12 is flowchart illustrating a process for updating information of an access point according to an exemplary embodiment.

Referring to FIG. 12, the location measuring server 250 measures a location of the specific communication terminal using nearby access points as described with reference to FIG. 7. In this instance, the location measuring server 250 checks whether there is a new access point among the nearby access points of which information is received from the specific communication terminal in S707 (operation S1201). Specifically, the location measuring server 250 checks whether there is a new access point by checking whether location coordinates of the nearby access points received from the specific communication terminal can be extracted from the access point information DB 270.

When there is a new access point among the nearby access points of which information is received from the specific communication terminal, the location measuring server 250 checks whether the specific communication terminal supports the GPS location measurement (operation S1203). The location measuring server 250 may check whether the specific communication terminal supports the GPS location measurement by referring to a terminal information DB (not shown).

When the specific communication terminal supports the GPS location measurement, the location measuring server 250 performs a GPS location measurement for the specific communication terminal (operation S1205). Specifically, the location measuring server 250 requests the GPS location measurement by transmitting identity information of the specific communication terminal to the GPS server 1110, and receives a GPS location measurement result, that is, a location coordinate of the specific communication terminal from the GPS server 1110. However, it is understood that one or more other exemplary embodiments are not limited thereto. For example, according to another exemplary embodiment, the specific communication terminal may request the GPS location measurement from the GPS server 1110.

After the location measuring server 250 performs the GPS location measurement for the specific communication terminal as described above, the location measuring server 250 updates the access point information by storing, in the access point information DB 270, the GPS location measurement result, that is, the location coordinate, and the information of the nearby access points received from the specific communication terminal (operation S1207). That is, the location measuring server 250 stores, in the access point information DB 270, the access point information in the same structure as access point information for location collected by the access point information collecting terminal. For example, the location measuring server 250 records the GPS location measurement result as a collection location coordinate, and the information of the nearby access points received from the specific communication terminal as access point information collected at the corresponding collection location coordinate.

In the exemplary embodiment described with reference to FIGS. 11 and 12, when a new access point exists, the GPS location measurement for the specific communication terminal is performed and the GPS location measurement result and the information of the nearby access points received from the specific communication terminal are stored in the access point information DB 270. However, location measurement may be performed by the barycentric method using only information of access points excluding a new access point among nearby access points of which information is received from the specific communication terminal, and the obtained location measurement result and the information of the nearby access points may be stored in the access point information DB 270.

Specifically, in operation S707 of the location measuring method described with reference to FIG. 7, when there is a new access point among the nearby access points of which information is received from the specific communication terminal, that is, when an actual installation location coordinate or imaginary location coordinate of a certain access point (that is, a new access point) among the R selected access points can not be extracted from the access point information DB 270, the location measuring server 250 does not select the corresponding new access point and selects the other access points to re-organize R access points, and performs a location measurement using the re-organized R access points by the barycentric method. After location measurement is performed using the barycentric method as described above, the location measuring server 250 stores the location measurement result (that is, longitude and latitude coordinates) and the information of the nearby access points received from the specific communication terminal in the access point information DB 270. That is, access point information for location including information of the new access point is stored in the access point information DB 270.

Also, after the location measuring server 250 transmits the location measurement result to the specific communication terminal using the information of the nearby access points received from the specific communication terminal, the location measuring server 250 may receive a location correction request from the specific communication terminal. The location correction request may include the location measurement result and a correction location coordinate selected by a user.

That is, when the location measurement result obtained using the information of the nearby access points is not identical to a location coordinate of the specific communication terminal, the user may select a location correction menu of the specific communication terminal and select an actual location coordinate on the map. Then, the specific communication terminal transmits the location correction request including the actual location coordinate to the location measuring server 250, and the location measuring server 250 stores the actual location coordinate included in the location correction request and the information of the nearby access points in the access point information DB 270. That is, the location measuring server 250 stores the information of the new access point in the access point information DB 270.

Figure 13:
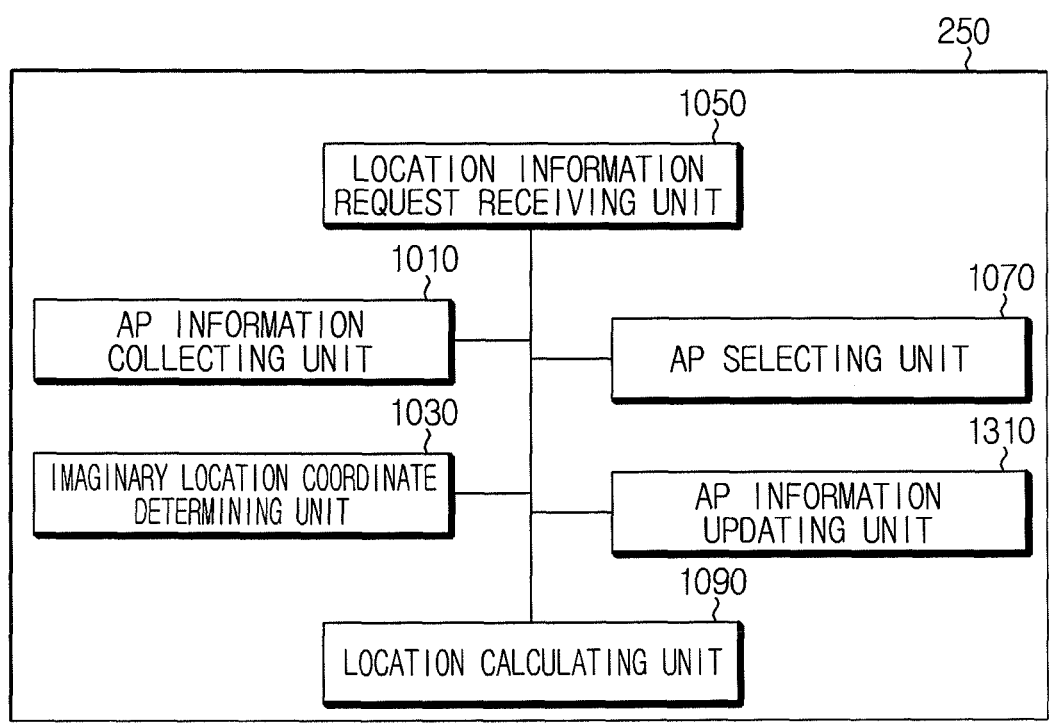
FIG. 13 is a block diagram illustrating a structure of a location measuring server according to another exemplary embodiment.

FIG. 13 is a block diagram illustrating a structure of the location measuring server 250 according to another exemplary embodiment. In FIG. 13, the elements having the same reference numerals as those of FIG. 10 perform the same or similar operations as described with reference to FIG. 10.

As shown in FIG. 13, the location measuring server 250 further includes an access point information updating unit 1310.

When the location calculating unit 1090 cannot extract, from the access point information DB 270, a location coordinate of a certain access point among the nearby access points of which information is received from the specific communication terminal to calculate a location coordinate of the specific communication terminal using access points, that is, when there is a new access point among the nearby access points, the location calculating unit 1090 requests the access point information updating unit 1310 to update the access point information.

The location calculating unit 1090 calculates a location coordinate of the specific communication terminal using information of access points excluding the new access point among the nearby access points of which information is received from the specific communication terminal.

The access point information updating unit 1310 requests the GPS server 1110 to measure a location of the specific communication terminal, and when the access point information updating unit 1310 receives a location coordinate from the GPS server 1110, the access point information updating unit 1310 stores the received location coordinate in the access point information DB 270, together with the information of the nearby access points received from the specific communication terminal.

Alternatively, the access point information updating unit 1310 may receive a location coordinate of the specific communication terminal from the location calculating unit 1090, and store the received location coordinate in the access point information DB 270 together with the information of the nearby access points received from the specific communication terminal. When the specific communication terminal does not support a GPS function, the access point information updating unit 1310 may update the access point information using a location coordinate of the specific communication terminal received from the location calculating unit 1090.

Also, when the imaginary location coordinate determining unit 1030 calculates an imaginary location coordinate of an access point not having an actual installation location coordinate, the imaginary location coordinate determining unit 1030 calculates an imaginary location coordinate by referring to access point information updated by the access point information updating unit 1310.

With the spread of smart phones, the installation of access points is rapidly increasing. The use of an access point information collecting terminal to collect access point information has not only time and cost limitations, but other limitations as well. According to one or more exemplary embodiments, when an access point information collecting terminal detects a new access point other than previously collected access points while the access point information collecting terminal collects access point information to measure a location of a communication terminal, access point information for location is automatically updated. As a result, the time and costs may be saved, and the precision of location measurement may be quickly improved.

A method of one or more exemplary embodiments may be recorded in non-transitory computer-readable media (CD ROM, random access memory (RAM), read-only memory (ROM), floppy disks, hard disks, magneto-optical disks, and the like) including program instructions to implement various operations embodied by a computer. Moreover, one or more units of the access point 290, the communication terminals, the location measuring server 250, etc., can include a processor or microprocessor executing a computer program stored in a computer-readable medium.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for updating information of an access point in a location measurement using the access point, the method comprising:
    receiving information of nearby access points from a specific communication terminal to be measured for location;
    checking whether there exists an access point, among the nearby access points, of which information is not stored in a storage unit;
    performing a global positioning system (GPS) location measurement for the specific communication terminal when there exists the access point of which the information is not stored;
    storing a result of the GPS location measurement and the received information of the nearby access points in the storage unit;
    after the receiving, extracting location coordinates of the nearby access points from the storage unit; and
    calculating a location coordinate of the specific communication terminal using the extracted location coordinates of the nearby access points,
    wherein the calculating of the location coordinate of the specific communication terminal comprises:
        calculating a barycentric coordinate using the extracted location coordinates of the nearby access points; and
        determining the calculated barycentric coordinate as the location coordinate of the specific communication terminal wherein the calculating of the barycentric coordinate comprises:
        grouping the extracted location coordinates into a plurality of first groups and calculating first barycentric coordinates of the plurality of first groups; and
        grouping the calculated first barycentric coordinates into a plurality of second groups and calculating second barycentric coordinates of the plurality of second groups in a repetitive manner to obtain one final barycentric coordinate.

2. An apparatus for updating information of an access point with a link to a global positioning system (GPS) location measuring unit in a location measurement using the access point, the apparatus comprising:
    a storage unit which stores information of access points;
    a receiving unit which receives information of nearby access points from a specific communication terminal to be measured for location;
    an updating unit which performs a GPS location measurement for the specific communication terminal using the GPS location measuring unit when there exists an access point, among the nearby access points, of which information is not stored in the storage unit, and which stores a result the GPS location measurement result and the received information of the nearby access points in the storage unit; and
    a calculating unit which extracts location coordinates of the nearby access points from the storage unit, and which calculates a location coordinate of the specific communication terminal using the extracted location coordinates,
    wherein the calculating unit calculates a barycentric coordinate using location coordinates of the nearby access points, and determines the calculated barycentric coordinate as the location coordinate of the specific communication terminal, and
    wherein the calculating unit groups the location coordinates into a plurality of first groups and calculates first barycentric coordinates of the plurality of first groups, and groups the calculated first barycentric coordinates into a plurality of second groups and calculates second barycentric coordinates of the plurality of second groups in a repetitive manner to obtain one final barycentric coordinate.

* * * * *